United States Patent Office 2,911,397
Patented Nov. 3, 1959

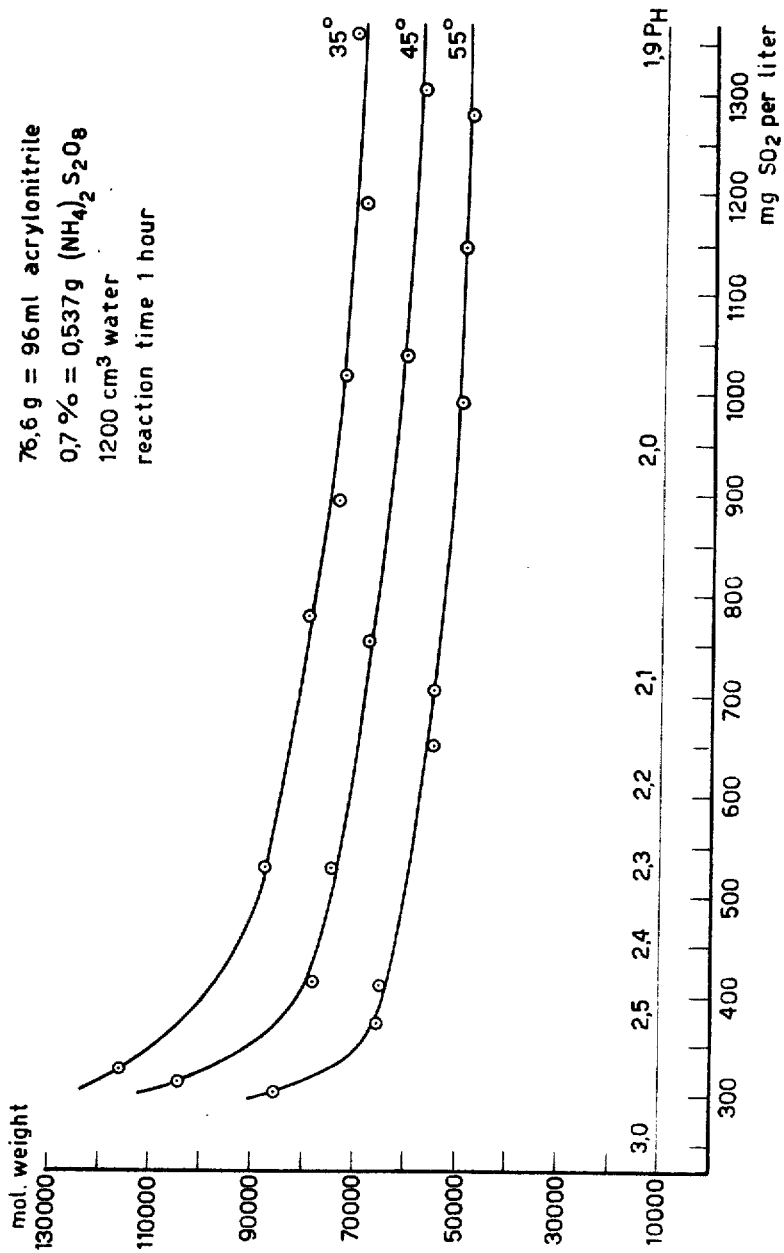

2,911,397

PROCESS FOR POLYMERIZING ACRYLONITRILE USING AN OXYGEN YIELDING CATALYST AND SULFUR DIOXIDE AS AN ACTIVATOR

Henricus Josephus Hubertus Janssen and Cornelis Christiaan Kloppenburg, Nimeguen, Netherlands, assignors to Kunstzijdespinnerij Nyma N.V., Nimeguen, Netherlands, a limited liability company under Netherlands laws Application September 15, 1953, Serial No. 380,266

Claims priority, application Netherlands October 28, 1952

1 Claim. (Cl. 260—88.7)

The invention relates to a process for the manufacture of polymers of acrylonitrile with a uniform molecular weight, by polymerizing acrylonitrile in an aqueous $SO_2$ solution with the aid of a water-soluble oxygen yielding catalyst. Hereby is understood that the circumstances of preparation are chosen in such a manner that the molecular weight of the polymer to be prepared can be easily controlled. This is of great importance because for processing polyacrylonitrile on a technical scale to threads, foils and the like a uniform polymer is required.

It is known to polymerize a homogeneous aqueous solution of an acrylonitrile mixed or not with one or more other polymerizable unsaturated compounds, under influence of a water-soluble oxygen yielding catalyst, activated, if desired by a water-soluble oxidizable oxygen-containing sulfur compound.

From U.S. Patent No. 2,628,223 furthermore the preparation is known of a polymer with uniform molecular weight by carrying out the polymerization in the presence of a persulfate catalyst and an activator consisting of a water-soluble sulfoxy reducing agent in a medium the pH value of which is kept constant during the polymerization, which pH value should be between 2.5 and 3.5. It appears from this patent that the graphic representation of the molecular weight as a function of the pH value displays a minimum which minimum lies between the pH values 2.5 and 3.5.

In contradistinction with the above, we have found that when polymerizing acrylonitrile in an aqueous $SO_2$-solution with the aid of an oxygen yielding compound, such as persulfate, as a catalyst, there is no minimum in the molecular weight pH value curve. It appeared at the same time that, in distinction with the process known from the above-mentioned patent, the molecular weight of a polymer prepared in an $SO_2$-solution, the $SO_2$ concentration of which is such that the pH value of that solution lies between 2.5 and 3.5, is strongly dependent on that pH value.

We have found that the molecular weight of the acrylonitrile polymer is practically independent of the $SO_2$ concentration when the quantity of $SO_2$ is more than 1.5% of the acrylonitrile quantity and polymerization is accordingly effected at a pH up to 2 in the presence of the oxygen yielding compounds, such as a persulfate, perborate, hydrogen peroxide, etc. It is clear that the process found has great technical advantages over those described in the above-mentioned patent because the pre-adjustment of the pH value of the reaction mixture and the control and correction of said pH value during the reaction can now be entirely omitted since the above pH limit is automatically obtained by the addition of the stated minimum quantity of $SO_2$. Moreover, the quantities of $SO_2$ used are of such a kind that herein an economic advantage is obtained over the use of sodium metabisulfite. Moreover, a correct measurement of the pH value in this medium can only be carried out with great difficulties, because the insoluble polymer precipitates on the electrodes and disturbs the measurement of the pH value.

The invention is not restricted to one definite temperature or catalyst concentration. It appears clearly from the annexed graph in which the observations of Table II are represented that the course of the molecular weight $SO_2$ curves is analogous at various temperatures.

The invention is not restricted either to the polymerization of acrylonitrile only, but it gives the same advantages when polymerizing mixtures of acrylonitrile with one or more other polymerizable compounds. Furthermore it is not necessary to proceed in a homogeneous medium.

The polymers and copolymers obtained according to the invention, after dissolving in e.g. methyl formamide and extrusion according to the dry as well as to the wet spinning method, after stretching and fixing, give threads of an excellent quality.

EXAMPLE I

Into a round bottomed flask with 3 necks provided with a stirrer, separating funnel, thermometer, cooler and inlet tube for nitrogen, 1100 ml. of water are introduced. The stirrer is put into action and during 15 minutes pure nitrogen is passed through the water at a temperature of 45° C. Hereupon 76.6 g., i.e. 96 ml. of acrylonitrile are introduced through the separating funnel.

This monomer dissolves entirely in the water in 5 minutes under stirring. Immediately after each other 0.7%, i.e. 0.537 g., of ammonium persulfate dissolved in 50 cm.³ of water and 50 cm.³ of an $SO_2$-solution, containing 1248 mg. of $SO_2$ are added. The polymerization is continued for exactly one hour at 45° C. The polymer formed is sucked off, washed with warm water and acetone and dried at 70° C. The yield amounts to 93--95%. The molecular weight of the polymer formed is 60,000 calculated by multiplying the intrinsic viscosity by 32,700.

EXAMPLE II

Polymerization of acrylonitrile is carried out in the same manner as described in Example I in which, however, 50 cm.³ is used of an $SO_2$-solution, containing 1565 mg. of $SO_2$. The polymer obtained now has a molecular weight of 57,000, calculated from the intrinsic viscosity by multiplying this by 32,700.

EXAMPLE III

In the same manner as described in Example I three polymerizations were carried out at 55° C. with varying quantities of $SO_2$. The following Table I indicates the quantities of $SO_2$ used and the molecular weights of the polymers formed.

*Table I*

| Mg. $SO_2$ per liter: | Molecular weight |
|---|---|
| 995 | 49,000 |
| 1148 | 48,800 |
| 1280 | 47,800 |

With the aid of these examples it becomes clear that a slight deviation of the $SO_2$-concentration practically has no influence on the molecular weight of the polymer obtained.

The results of other corresponding tests are represented —with the examples already mentioned—in the following Table II and the graph.

Table II

| 35° C. | | 45° C. | | 55° C. | |
|---|---|---|---|---|---|
| mg. SO₂ per liter | mol weight | mg. SO₂ per liter | mol weight | mg. SO₂ per liter | mol weight |
| 326 | 116,000 | 314 | 104,500 | 304 | 85,500 |
| 530 | 87,500 | 416 | 78,000 | 374 | 65,300 |
| 781 | 79,500 | 528 | 74,000 | 413 | 64,800 |
| 897 | 73,500 | 755 | 67,500 | 653 | 54,500 |
| 1,020 | 72,300 | 1,040 | 60,000 | 708 | 54,500 |
| 1,193 | 68,500 | 1,304 | 57,000 | 995 | 49,000 |
| 1,363 | 70,500 | | | 1,148 | 48,800 |
| | | | | 1,280 | 47,800 |

It appears from this graphic representation that in this case below an SO₂-content of 500 mg. per liter, corresponding with 0.75% of SO₂ in respect of the monomer— a slight loss of SO₂ during the polymerization already gives a great difference in the molecular weight of the polymer obtained, in other words that then the molecular weight of the product obtained is indefinite and consequently the reproducibility fails. One is entirely sure of the reproducibility if the SO₂ content amounts to more than 1000 mg. per liter, corresponding to an SO₂-content of 1.5% in respect of the monomer, the graph showing the molecular weight curves to be substantially flat at a pH up to 2.

It is remarked that an increase of the $SO_2$-content from 500 mg. per liter to 1000 mg. per liter decreases the pH value from 2.4 to 2.0.

We claim:

A process for the polymerization of acrylonitrile to obtain an acrylonitrile polymer of uniform molecular weight, which consists of forming a homogeneous aqueous medium consisting of acrylonitrile, a water-soluble oxygen-yielding catalyst and sulfur dioxide as an activator dissolved in water, the molar quantity of $SO_2$ exceeding that of the catalyst and the quantity of $SO_2$ being more than 1.5% of the acrylonitrile quantity, and polymerizing the dissolved acrylonitrile in the homogeneous medium at a pH value not exceeding 2.

References Cited in the file of this patent

UNITED STATES PATENTS

| 2,436,926 | Jacobson | Mar. 2, 1948 |
| 2,486,241 | Arnold | Oct. 25, 1949 |
| 2,628,223 | Richards | Feb. 10, 1953 |
| 2,629,711 | Stanin et al. | Feb. 24, 1953 |
| 2,673,192 | Hill | Mar. 23, 1954 |

OTHER REFERENCES

Hackh's Chemical Dictionary, 3rd edition, 1944. Published by The Blakiston Co., Philadelphia, Pa., page 822 relied on.